United States Patent [19]
Yamamoto

[11] Patent Number: 5,460,044
[45] Date of Patent: Oct. 24, 1995

[54] SEMICONDUCTOR ACCELERATION DETECTING APPARATUS

[75] Inventor: Masahiro Yamamoto, Itami, Japan

[73] Assignee: Mitsubishi Denki Kabushiki Kaisha, Tokyo, Japan

[21] Appl. No.: 171,614

[22] Filed: Dec. 22, 1993

[30] Foreign Application Priority Data

Dec. 25, 1992 [JP] Japan .................... 4-346967

[51] Int. Cl.⁶ .................................................. G01P 15/09
[52] U.S. Cl. ............................ 73/514.16; 73/1 D
[58] Field of Search ............................ 73/1 D, 517 AV, 73/517 R

[56] References Cited

U.S. PATENT DOCUMENTS

| | | | |
|---|---|---|---|
| 4,829,822 | 5/1989 | Imai et al. | 73/517 R |
| 5,060,504 | 10/1991 | White et al. | 73/1 D |
| 5,343,731 | 9/1994 | Miyano | 73/1 D |
| 5,351,542 | 10/1994 | Ichimura et al. | 73/517 R |

*Primary Examiner*—Richard E. Chilcot, Jr.
*Assistant Examiner*—Max H. Noori
*Attorney, Agent, or Firm*—Leydig, Voit & Mayer

[57] ABSTRACT

In a semiconductor acceleration detecting apparatus, an amplification circuit is provided on a movable portion of an acceleration detecting beam, not on a fixed portion thereof, and the size of the fixed portion and the circuit area thereon are thus reduced. A damage detecting circuit is mounted on the fixed portion to detect breakage of the acceleration detecting beam and damage to various circuits, and a damage detecting interconnection is disposed along a peripheral edge of the movable portion, across a diaphragm and across an outer peripheral edge of the movable portion. Consequently, the size of the acceleration detecting beam can be reduced without changing the size of the movable portion i.e., without changing the characteristics of the apparatus, thus reducing the entire size of the semiconductor acceleration detecting apparatus.

3 Claims, 3 Drawing Sheets

SEMICONDUCTOR ACCELERATION DETECTING APPARATUS

BACKGROUND OF THE INVENTION

1. Field of the Invention

The present invention relates to a semiconductor acceleration detecting apparatus and, more particularly, to a semiconductor acceleration detecting apparatus suitable for use in, for example, vehicles and industrial robots.

2. Description Of The Related Art

FIG. 4 is a cross-sectional and plan view of a conventional semiconductor acceleration detecting apparatus. FIG. 5 is a plan view of the conventional semiconductor acceleration detecting apparatus from which a cap has been removed. The conventional semiconductor acceleration detecting apparatus includes a base 9 which forms, together with a cap 9a, the exterior of the apparatus, and an acceleration detecting beam 2 fixed to the base 9 through a pedestal. The acceleration detection beam 2 includes a fixed portion 6 fixed to the base 9 by means of the pedestal 3, a diaphragm portion 4 formed at one end of the fixed portion 6 integrally therewith, and a movable portion 5 connected to the fixed portion 6 through the diaphragm portion 4. The diaphragm portion 4 has a thickness smaller than the thickness of the fixed portion 6 and movable portion 5, and flexes in response to the acceleration applied to the acceleration detection beam 2. A sensor circuit 1 for generating an electrical signal representing the amount of flexing of the diaphragm portion 4 is formed on the surface of the diaphragm portion 4. The sensor circuit 1 is a bridge circuit of gauge resistor elements 1a which utilize the piezo resistance effect and whose resistance varies according to a stress applied thereto. The electric signal from the sensor circuit 1 is amplified by an amplification circuit 7 disposed on the fixed portion 6 of the acceleration detecting beam 2, and the amplified signal is supplied to an external circuit via wires 11 and lead pins 10. On the fixed portion 6 of the acceleration detecting beam 2 is also disposed a diagnosis circuit 8 for determining whether the signal from the amplification circuit 7 is abnormal. The signal from the diagnosis circuit 8 is also supplied to the external circuit via the wires 11 and the lead pins 10. For the protection of the parts on the base 9, the base 9 is covered with the cap 9a which partially constitutes the exterior of the apparatus.

When an acceleration is applied to the thus-arranged conventional semiconductor acceleration detecting apparatus, a stress concentrates on the diaphragm portion 4 in the acceleration detecting beam 2 and the semiconductor acceleration detecting apparatus thereby flexes at the diaphragm portion 4 thereof. This deformation of the diaphragm portion 4 changes the resistance of the gauge resistors 1a. Accordingly, the bridge circuit is unbalanced and thereby generates an electrical signal which is detected as an acceleration. The generated electrical signal is amplified by the amplification circuit 7, and the amplified signal is supplied outside of the apparatus constituted by the base 9 and the cap 9a via the wires 11 and the lead pins 10.

In the conventional semiconductor acceleration detecting apparatus, the amplification circuit 7 and the diagnosis circuit 8 are disposed on the fixed portion 6 of the acceleration detecting beam 2, as mentioned above, and the fixed portion 6 must therefore have a size large enough to carry the circuits 7 and 8. In other words, the size of the fixed portion 6 cannot be reduced. In addition, since the size of the movable portion 5 greatly affects the characteristics of the acceleration detection apparatus, such as the sensitivity thereof, it cannot be changed carelessly. Thus, the arrangement of the semiconductor acceleration detecting apparatus must be such that a sufficient size is secured in the fixed portion without reducing the size of the movable portion 5. In such a semiconductor acceleration detecting apparatus, however, the size of the acceleration detecting beam 2 is inevitably large and the entire size of the semiconductor acceleration detecting apparatus is, hence, large.

SUMMARY OF THE INVENTION

The present invention is intended to overcome the aforementioned problem of the prior art, and an object thereof is to provide a semiconductor acceleration detecting apparatus which enables the size of the acceleration detecting beam 2 to be reduced without changing the size of the movable portion 5 of the acceleration detecting beam 2, i.e, without influencing the characteristics of the apparatus, so as to reduce the entire size of the apparatus.

In order to achieve the above object, according to one aspect of the present invention, there is provided a semiconductor acceleration detecting apparatus which comprises a base, an acceleration detecting beam including a fixed portion fixed to the base, a movable portion provided at an end of the fixed portion, and a diaphragm disposed between the fixed portion and the movable portion, the diaphragm being bent according to an acceleration applied thereto, a sensor circuit provided on the diaphragm of the acceleration detecting beam, the sensor circuit generating an electrical signal representing the amount of flexing of the diaphragm, an amplification circuit for amplifying the electrical signal from the sensor circuit and for outputting an amplified signal, and a diagnosis circuit provided on the fixed portion of the acceleration detecting beam, the diagnosis circuit determining whether the output of the amplification circuit is abnormal. The amplification circuit is provided on the movable portion of the acceleration detecting beam.

According to another aspect of the present invention, the semiconductor acceleration detecting circuit further includes a damage detecting interconnection which extends from the fixed portion of the acceleration detecting beam, across the diaphragm, along an outer peripheral edge of the movable portion and around the amplification circuit, then across the diaphragm again before returning to the fixed portion, and a damage detecting circuit provided on the fixed portion of the acceleration detecting beam to detect breakage of the damage detecting interconnection connected to the damage detecting circuit, whereby damage to the acceleration detecting beam and the sensor circuit and amplification circuit provided thereon are detected.

In the semiconductor acceleration detecting apparatus according to the present invention, since the amplification circuit is provided on the movable portion of the acceleration detecting beam, not on the fixed portion thereof, the size of the fixed portion and the circuit area thereof can be reduced. Accordingly, the size of the acceleration detecting beam can be reduced and, consequently, the entire size of the semiconductor acceleration detecting apparatus can be reduced. Further, the acceleration detecting beam, particularly the movable portion and the amplification circuit provided thereon, may be damaged by a shock or the like. However, since the damage detecting circuit is provided on the fixed portion and the damage detecting interconnection is disposed along the peripheral edge of the movable portion, it is possible to detect damage, e.g., breakage, of the acceleration detecting beam.

DETAILED DESCRIPTION OF THE PREFERRED EMBODIMENTS

Figure 1:
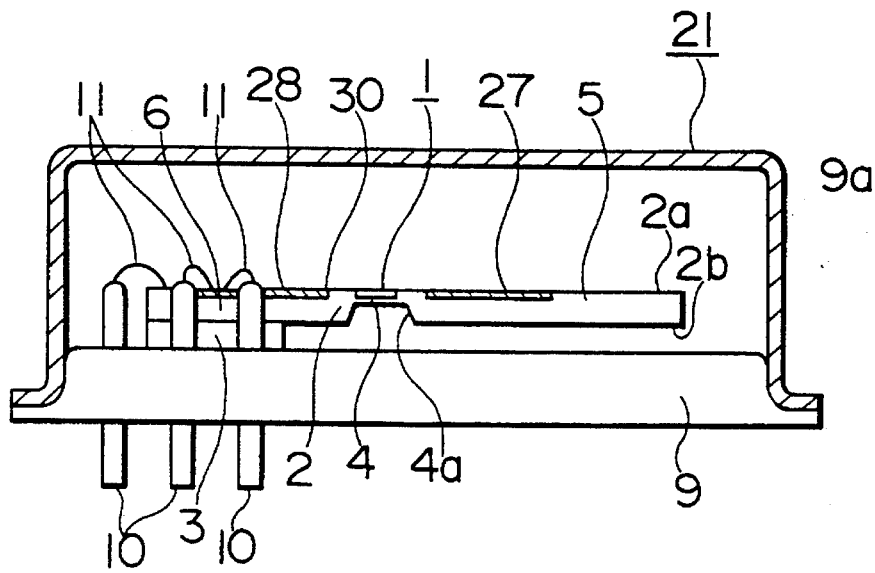
FIG. 1 is a cross-sectional view of an embodiment of a semiconductor acceleration detecting apparatus according to the present invention.
Figure 2:
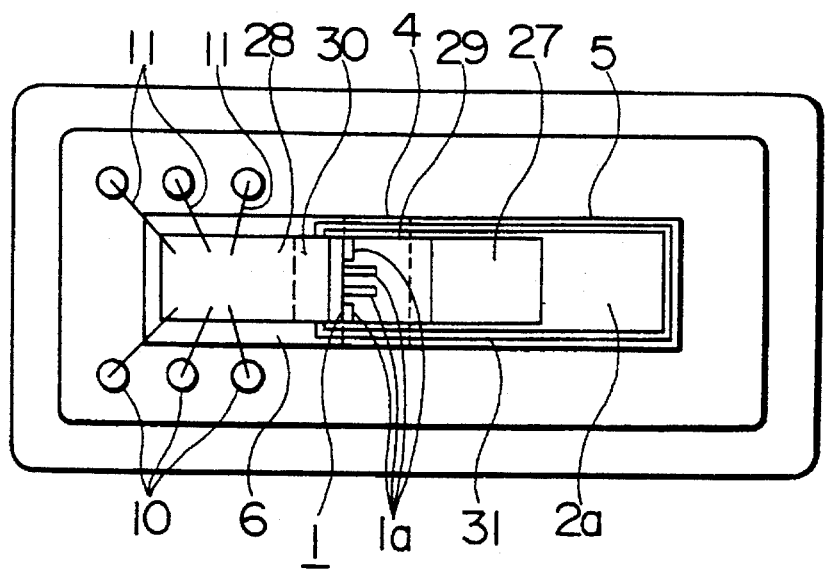
FIG. 2 is a schematic plan view of the semiconductor acceleration detecting apparatus of FIG. 1 with a cap removed therefrom.

An embodiment of a semiconductor acceleration detecting apparatus according to the present invention will be described below with reference to FIGS. 1 through 3. FIG. 1 is a cross-sectional view of the semiconductor acceleration detecting apparatus according to the present invention. FIG. 2 is a plan view of the semiconductor acceleration detecting apparatus with a cap removed therefrom. The semiconductor acceleration detecting apparatus includes a base 9 which, together with the cap 9a, constitutes an exterior 21, and an acceleration detecting beam 2 fixed to the base 9 through a pedestal 3. The acceleration detecting beam 2, which is a substantially rectangular plate-like member made of silicon, has a fixed portion 6 fixed to the base 9 by means of the pedestal 3, a diaphragm portion 4 provided at one end of the fixed portion 6 and integral therewith, and a movable portion 5 connected to the fixed portion 6 through the diaphragm portion 4. The diaphragm portion 4 is formed by a groove 4a across the acceleration detecting beam 2 separating the fixed portion 6 from the movable portion 5. The diaphragm portion 4 has a thickness smaller than the thickness of the movable portion 5 and fixed portion 6, and flexes in response to an acceleration applied to the acceleration detecting beam 2. In order to maintain a first surface 2a of the acceleration detecting beam 2 (which is an upper surface thereof as viewed in FIG. 1, i.e., the surface thereof to which the pedestal 13 is not fixed) flat, the groove 4a is formed in a second surface 2b of the acceleration detecting beam 2 (which is a lower surface thereof, as viewed in FIG. 1, i.e., which is a surface thereof on which the pedestal 3 is fixed).

A sensor circuit 1, which generates an electrical signal representing the amount of flexing of the diaphragm portion 4, is disposed on the surface of the diaphragm portion 4, i.e., on the first surface 2a of the acceleration detecting beam 2 at a position corresponding to the diaphragm portion 4. The sensor circuit 1 is a known sensor circuit, i.e., it may be a bridge circuit of gauge resistor elements 1a which utilize the piezo resistance effect and whose resistance varies according to a stress applied thereto.

In the present invention, an electrical signal from the sensor circuit 1 is supplied to an amplification circuit 27 disposed on the movable portion 5 and on the first surface 2a of the acceleration detecting beam 2. The amplification circuit 27 amplifies the electrical signal from the sensor circuit 1. The electrical signal from the amplification circuit 27 is supplied to a diagnosis circuit 28 disposed on the fixed portion 6 of the acceleration detecting beam 2. The diagnosis circuit 28 determines whether the output signal of the amplification circuit 27 is abnormal. The signal from the diagnosis circuit 28 is supplied to an external circuit (not shown) via wires 11 and lead pins 10 fixed to the base 9. The sensor circuit 1, the amplification circuit 27 and the diagnosis circuit 28 are connected with each other via interconnections 29. For the protection of the parts on the base 9, the base 9 is packaged with the cap 9a which partially constitutes the exterior 21 of the apparatus.

The semiconductor acceleration detecting apparatus further includes a damage detecting circuit 30 on the fixed portion 6 of the acceleration detecting beam 2 and on the first surface 2a thereof, and a damage detecting interconnection 31 extending from the damage detecting circuit 30 to the movable portion 5 of the acceleration detecting beam 2. The damage detecting interconnection 31 is formed on the acceleration detecting beam 2 made of silicon by, for example, diffusion, and is relatively brittle. The damage detecting interconnection 31 is made of a material having an adequate resistance, which will be described later, and which, for example, breaks together with the acceleration detecting beam 2 when the beam 2 is subjected to a shock and thus breaks. The damage detecting interconnection 31 extends from the fixed portion 6 on which the damage detecting circuit 30 is provided and along the first surface 2a of the acceleration detecting beam 2, across the diaphragm portion 4 at one of the outermost edges thereof, along the outer peripheral edge of the movable portion 5 and around the amplification circuit 27, then across the diaphragm portion 4 again at the other outermost edge thereof and returns to the fixed portion 6, i.e., to the damage detecting circuit 30. The damage detecting circuit 30, which is provided on the fixed portion 6 of the acceleration detecting beam 2, detects breakage of the damage detecting interconnection 31 connected thereto, thereby detecting damage to the diaphragm portion 4 and movable portion of the acceleration detecting beam 2 and damage to the sensor circuit 1 and amplification circuit 28 respectively provided thereon.

Figure 3:
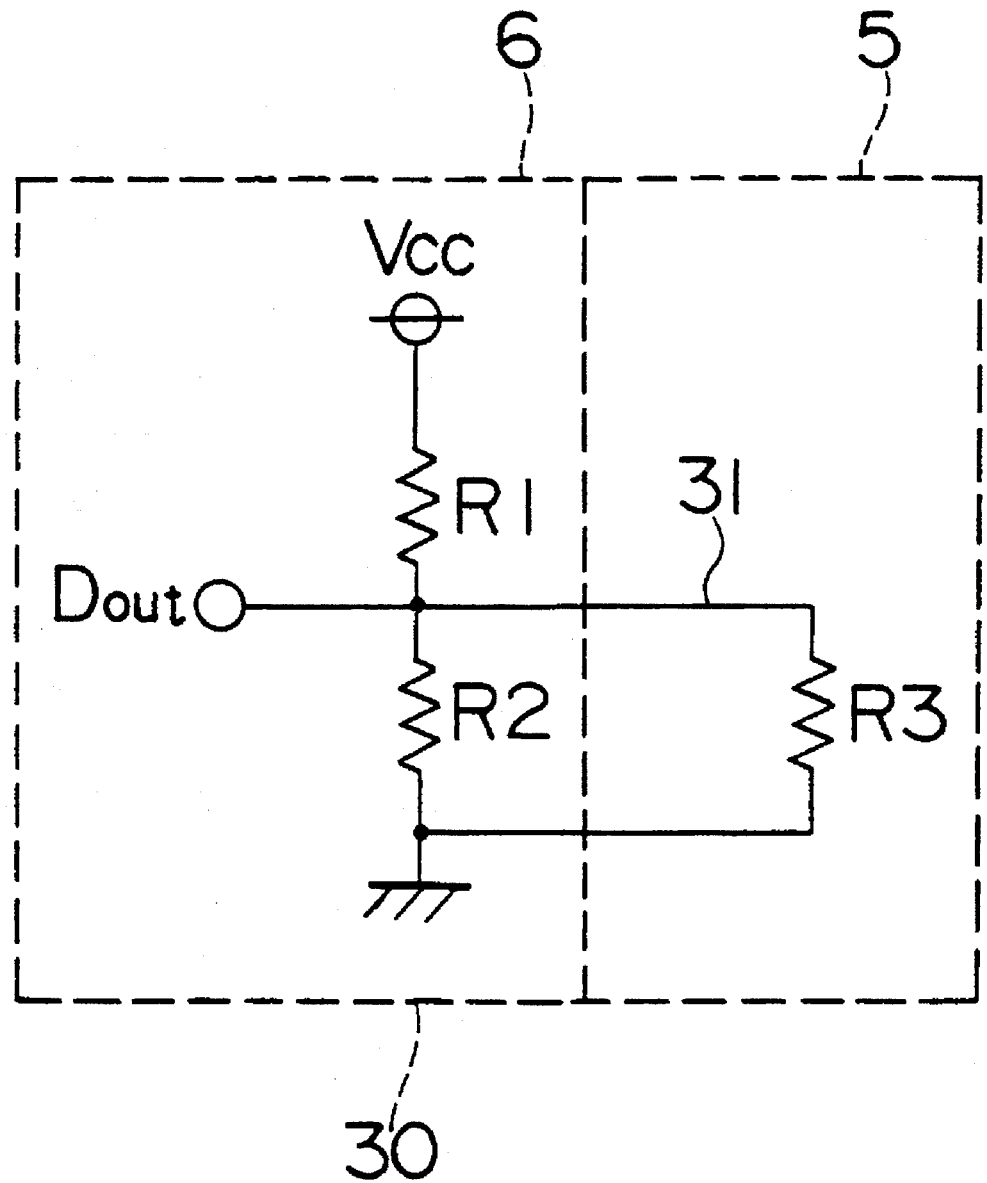
FIG. 3 is a circuit diagram showing a damage detecting circuit and a damage detecting interconnection in an embodiment of the present invention.
Figure 4:
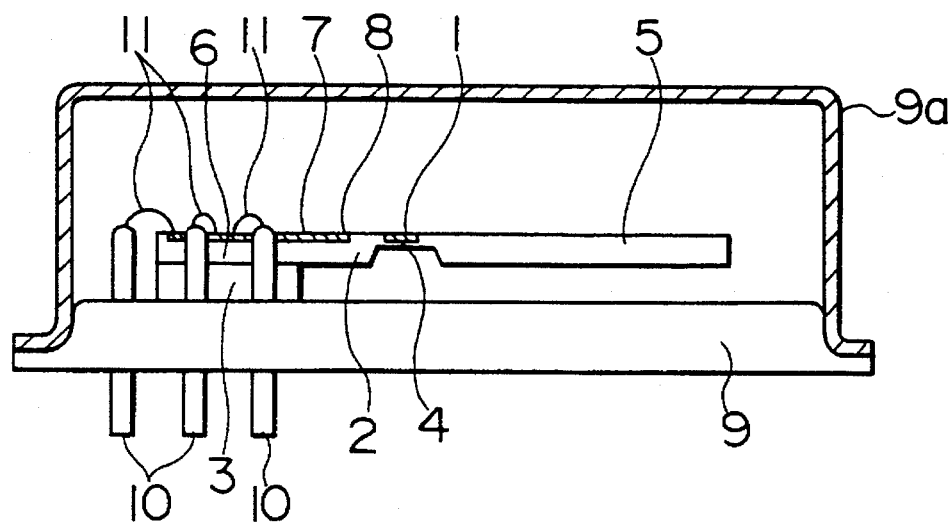
FIG. 4 is a cross-sectional view of a conventional semiconductor acceleration detecting apparatus.
Figure 5:
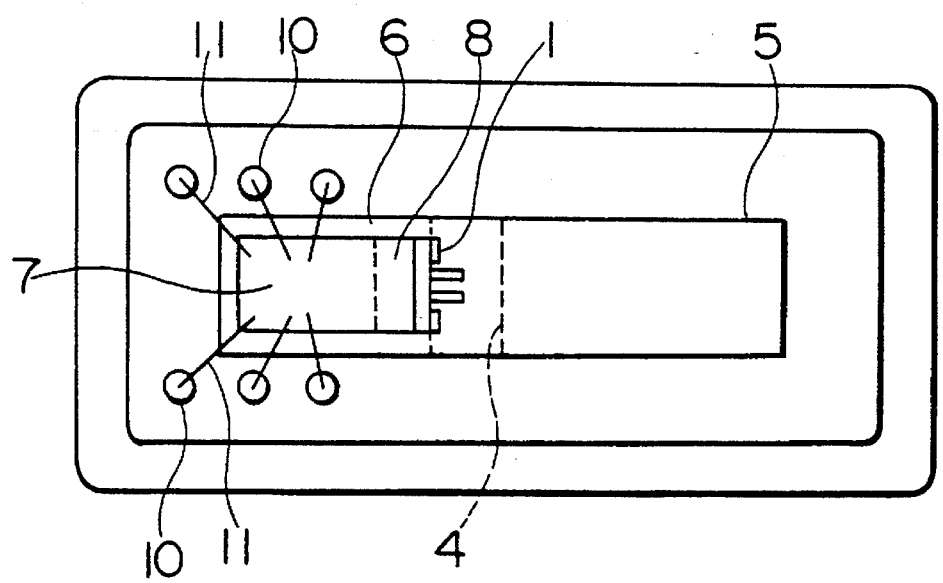
FIG. 5 is a schematic plan view of the semiconductor acceleration detecting apparatus of FIG. 4 with a cap removed therefrom.

FIG. 3 shows an example of the damage detecting circuit 30 and that of the damage detecting interconnection 31. In the damage detecting circuit 30 provided on the fixed portion 6 of the acceleration detecting beam 2, a low-resistance resistor R1 and a high resistance R2 are series connected between an applied voltage Vcc, which is common to the damage detecting circuit 30 and the amplification circuit 27 or the like, and an earth, and an output terminal $D_{out}$ is connected between the resistors R1 and R2. On the damage detecting interconnection 31, a low resistance resistor R3 is connected parallel to the high resistance R2 and disposed on the movable portion 5. A combined resistance R2//R3 of the parallel connected high resistance R2 and the low resistance R3 is the same as that of the low resistor R1. Three resistances have the relations expressed by R2>R1, R3 and R1=R2//R3. Detection of breakage employs a determination potential $D_{out}$, which is the divided voltage between the low resistance R1 and the combined resistor R2//R3 of the high resistance R2 and low resistor R3. In normal operation, the output of the damage detecting circuit 30 is half the applied voltage Vcc. However, when the damage detecting interconnection 31 breaks, the low resistance R3 is opened, and the divided voltage of the high resistance R2 and the low resistance R1 thus becomes the output of the damage detecting circuit 30. Accordingly, the circuit output $D_{out}$≈the applied voltage Vcc, and this enables breakage of the damage detecting interconnection 31 to be detected readily.

It is the movable portion 5 or the diaphragm portion 4 of the acceleration detection beam 2 which is damaged, i.e., breaks in response to, for example, a shock, and breakage of the accelerating detecting beam 2 starts from the outer peripheral portion thereof. Therefore, the damage detecting interconnection 31 is disconnected before the amplification circuit 27 is damaged and thus becomes abnormal, and detection of an abnormality in advance is thus enabled. Further, since the damage detecting interconnection 31 is disposed along the outermost edge of the movable portion 5 of the acceleration detecting beam 2, the damage, e.g., breakage, of the movable portion 5 is also detected by the disconnection of the damage detecting interconnection 31. The movable portion 5 serves as the weight of the acceleration detecting beam 2, and the damage, breakage, of the movable portion 5 thus undesirably changes the characteristics of the apparatus, e.g., reduces the sensitivity thereof. Thus, the capability of detection of damage to the acceleration detecting beam 2 is very useful.

As will be understood from the foregoing description, in the semiconductor acceleration detecting apparatus according to the present invention, since the amplification circuit is provided on the movable portion of the acceleration detecting beam, not on the fixed portion thereof, the size of the fixed portion and the circuit area thereon can be reduced. Accordingly, the size of the acceleration detecting beam can be reduced without adversely affecting the characteristics of the apparatus, and consequently the entire size and production cost of the semiconductor acceleration detecting apparatus can be reduced. Further, since the damage detecting circuit is provided on the fixed portion and the damage detecting interconnection is disposed along the peripheral edge of the movable portion, damage, e.g., breakage, of the acceleration detecting beam can be detected.

What is claimed is:

1. A semiconductor acceleration detecting apparatus comprising:

a base;

an acceleration detecting beam including a fixed portion fixed to said base, a movable portion, and a diaphragm disposed between and connected to said fixed portion and said movable portion, said diaphragm flexing in response to an applied acceleration;

a sensor circuit disposed on said diaphragm of said acceleration detecting beam, said sensor circuit generating an electrical signal indicating flexing amount of said diaphragm;

an amplification circuit disposed on said movable portion of said acceleration detecting beam, said amplification circuit amplifying the electrical signal from said sensor circuit and outputting an amplified signal; and a diagnosis circuit disposed on said fixed portion of said acceleration detecting beam, said diagnosis circuit indicating whether the amplified signal is normal.

2. A semiconductor acceleration detecting apparatus comprising:

a base;

an acceleration detecting beam including a fixed portion fixed to said base, a movable portion, and a diaphragm disposed between and connected to said fixed portion and said movable portion, said diaphragm flexing in response to an applied acceleration;

a sensor circuit disposed on said diaphragm of said acceleration detecting beam, said sensor circuit generating an electrical signal indicating flexing amount of said diaphragm;

an amplification circuit disposed on said movable portion of said acceleration detecting beam, said amplification circuit amplifying the electrical signal from said sensor circuit and outputting an amplified signal;

a diagnosis circuit disposed on said fixed portion of said acceleration detecting beam, said diagnosis circuit indicating whether the amplified signal is normal;

a damage detecting interconnection extending from said fixed portion, across said diaphragm, along an outer peripheral edge of said movable portion around said amplification circuit, across said diaphragm again, and returning to said fixed portion; and a damage detecting circuit disposed on said fixed portion of said acceleration detecting beam, said damage detecting circuit detecting breakage of said damage detecting interconnection connected thereto and thereby detecting damage to any of said acceleration detecting beam, said sensor circuit, and said amplification circuit.

3. The semiconductor acceleration detecting apparatus of claim 2 wherein said damage detecting interconnection constitutes a first resistance and said damage detecting circuit comprises a second resistance, higher than the first resistance and connected in parallel with the first resistance, said damage detecting circuit comprising a third resistance substantially equal to the first resistance and connected in series with the second resistance.

* * * * *